US009013325B2

(12) United States Patent
Miller et al.

(10) Patent No.: US 9,013,325 B2

(45) Date of Patent: Apr. 21, 2015

(54) SYSTEM AND METHOD FOR TRAFFIC-CONTROL PHASE CHANGE WARNINGS

(75) Inventors: David Dodd Miller, Austin, TX (US); Mark Allen Clark, Pflugerville, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 910 days.

(21) Appl. No.: 12/848,286

(22) Filed: Aug. 2, 2010

(65) Prior Publication Data

US 2012/0026014 A1 Feb. 2, 2012

(51) Int. Cl.

| | |
|---|---|
| ***G08G 1/096*** | (2006.01) |
| ***G08G 1/095*** | (2006.01) |
| ***B60Q 1/00*** | (2006.01) |
| ***G08G 1/00*** | (2006.01) |
| ***G01P 5/00*** | (2006.01) |
| ***G08G 1/07*** | (2006.01) |

(52) U.S. Cl.

CPC ........................................ *G08G 1/07* (2013.01)

(58) Field of Classification Search

CPC ................................. G08G 1/07; G08G 1/096

USPC ...................................... 340/539.13; 701/117

See application file for complete search history.

(56) References Cited

U.S. PATENT DOCUMENTS

| | | | | |
|---|---|---|---|---|
| 5,539,398 | A | 7/1996 | Hall et al. | |
| 5,900,825 | A * | 5/1999 | Pressel et al. | 340/905 |
| 6,243,026 | B1 | 6/2001 | Jones et al. | |
| 6,262,673 | B1 | 7/2001 | Kalina | |
| 6,720,920 | B2 | 4/2004 | Breed et al. | |
| 6,985,073 | B1 | 1/2006 | Doan | |
| 7,327,280 | B2 | 2/2008 | Bachelder et al. | |
| 7,466,227 | B2 * | 12/2008 | Chen et al. | 340/539.13 |
| 2005/0187701 | A1 * | 8/2005 | Baney | 701/117 |
| 2006/0184312 | A1 * | 8/2006 | Kiim | 701/117 |
| 2008/0064332 | A1 * | 3/2008 | Lee et al. | 455/41.2 |
| 2008/0247668 | A1 | 10/2008 | Li et al. | |
| 2008/0260261 | A1 | 10/2008 | Li et al. | |
| 2008/0294401 | A1 | 11/2008 | Tsin et al. | |
| 2009/0109061 | A1 | 4/2009 | McNew et al. | |
| 2009/0128311 | A1 * | 5/2009 | Nishimura et al. | 340/435 |
| 2009/0153364 | A1 * | 6/2009 | Buchalo et al. | 340/993 |
| 2009/0174573 | A1 | 7/2009 | Smith | |
| 2009/0296989 | A1 | 12/2009 | Ramesh et al. | |
| 2010/0259419 | A1 * | 10/2010 | Renner et al. | 340/929 |

FOREIGN PATENT DOCUMENTS

| | | |
|---|---|---|
| EP | 1628274 | 5/2005 |
| GB | 2424110 | 9/2006 |

* cited by examiner

*Primary Examiner* — Jennifer Mehmood
*Assistant Examiner* — Pameshanand Mahase

(57) ABSTRACT

A roadside equipment (RSE) system that can be used for controlling traffic signals and other equipment and corresponding method. A method includes maintaining a traffic signal in a GREEN phase in a first direction, including displaying a GREEN indicator in the first direction. The method includes detecting an event indicating that the phase of the traffic signal in the first direction should be changed and changing the phase of the traffic signal to a pre-YELLOW phase in response to the detected event, including continuing to display the GREEN indicator in the first direction. The method includes wirelessly transmitting a message indicating the pre-YELLOW phase and a phase time, the phase time indicating a next change of phase of the traffic signal, and changing the phase of the traffic signal to a YELLOW phase when the phase time has been reached.

20 Claims, 2 Drawing Sheets

SYSTEM AND METHOD FOR TRAFFIC-CONTROL PHASE CHANGE WARNINGS

CROSS-REFERENCE TO OTHER APPLICATION

This application has some subject matter in common with commonly-assigned, concurrently-filed U.S. patent application Ser. No. 12/848,279 for "Signal Control Apparatus and Method with Vehicle Detection" and Ser. No. 12/848,283 for "System and Method for Lane-Specific Vehicle Detection and Control", both of which are hereby incorporated by reference.

TECHNICAL FIELD

The present disclosure is directed, in general, to improved traffic monitoring and control systems and methods.

BACKGROUND OF THE DISCLOSURE

For reasons related to safety, efficiency, environmental concerns, and other issues, improved traffic control and monitoring systems are desirable.

SUMMARY OF THE DISCLOSURE

Various disclosed embodiments include a system and method for controlling a traffic signal. A method includes maintaining a traffic signal in a GREEN phase in a first direction, including displaying a GREEN indicator in the first direction. The method includes detecting an event indicating that the phase of the traffic signal in the first direction should be changed and changing the phase of the traffic signal to a pre-YELLOW phase in response to the detected event, including continuing to display the GREEN indicator in the first direction. The method includes wirelessly transmitting a message indicating the pre-YELLOW phase and a phase time, the phase time indicating a next change of phase of the traffic signal, and changing the phase of the traffic signal to a YELLOW phase when the phase time has been reached. The method can include precise synchronization of on-board signal phase to the visible roadside signal phase.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
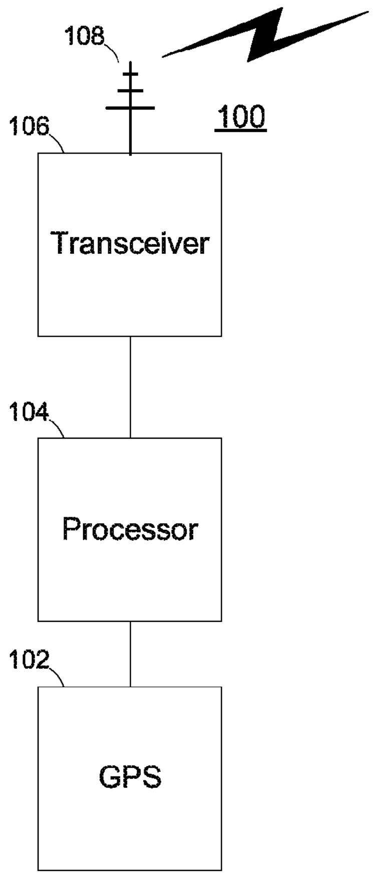
FIG. 1 depicts a simplified block diagram of an onboard equipment system in accordance with disclosed embodiments.
Figure 2:
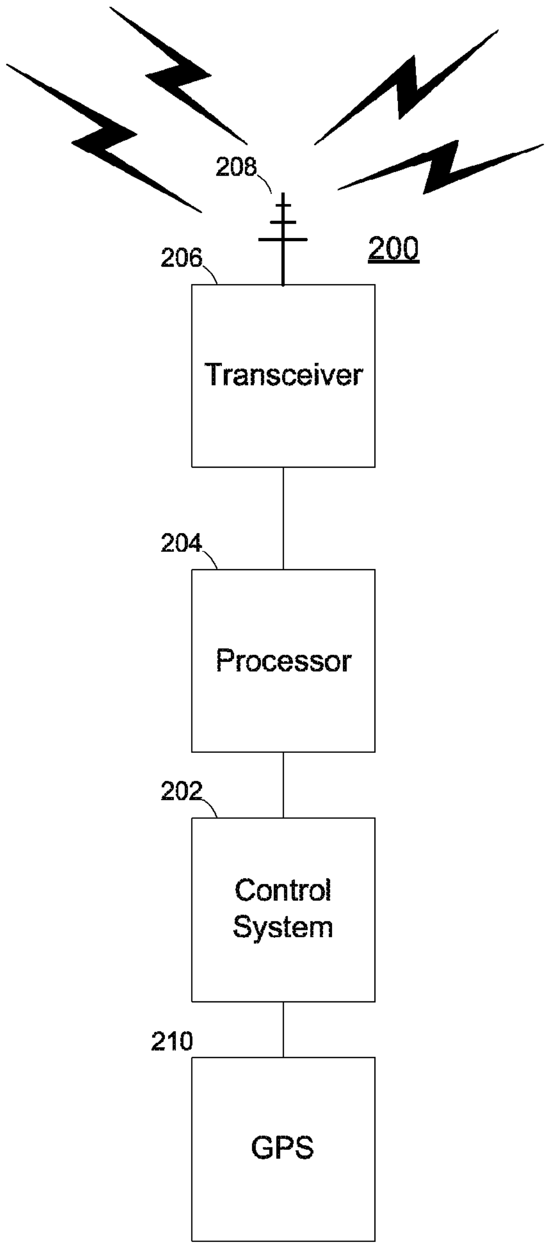
FIG. 2 depicts a simplified block diagram of a roadside equipment system, in accordance with disclosed embodiments.
Figure 3:
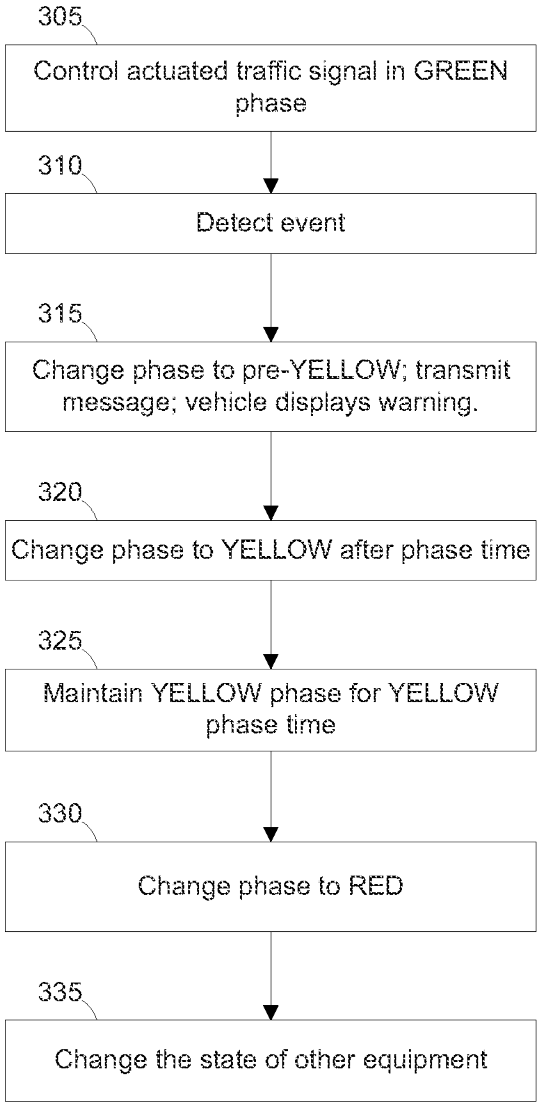
FIG. 3 depicts a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments include improved systems and methods for informing drivers of traffic signal phases and impended changes in those phases. Various embodiments create cooperation between vehicles and actuated traffic signals to avoid vehicle collisions by using a wireless radio link connecting the vehicle's on-board computer to the computer used to control traffic signals.

Specifically, the traffic signal controller sends signal phase and timing (SPaT) information to vehicles approaching a signalized intersection. The vehicle's on-board equipment (OBE) can then use the time remaining in the signal phase, along with the vehicle's speed, direction of travel and location to identify dangerous situations that could result in a collision. The OBE includes or is connected to a conventional vehicle computer system that monitors vehicle functions including speed, and also includes global positioning satellite systems as described in more detail below.

For example, if a vehicle is approaching a GREEN light at a legal speed of 55 MPH with little time remaining until YELLOW, the OBE knows from the speed, direction of travel and time remaining in GREEN that the signal will be RED when the vehicle arrives and warns the driver with an audible alarm or by chattering the antilock brakes to simulate a rumble strip.

Various embodiments specifically address the problem of actuated intersections. In actuated traffic signal controls, the traffic signal lights are not controlled by timing, but rather by approaching vehicles. For example, an actuated intersection could rest in GREEN on the main street forever until a vehicle approaching from a side street is detected by the signal controller, usually by wire loops cut into the pavement. When a side street vehicle is detected, the signal controller will change the main street signal from GREEN to YELLOW to RED, and then changes the side street signal to GREEN until the side street vehicle moves through the intersection. At that point, the side-street signal changes phases from GREEN to YELLOW to RED, followed by the main street signal changing back to GREEN.

A problem exists in that a vehicle approaching at high speed on the main street GREEN cannot receive the time remaining in GREEN from the signal control computer because the signal controller does not know when a side-street vehicle will be approaching.

The related patent application for "Signal Control Apparatus and Method with Vehicle Detection" incorporated herein describes a method whereby roadway lane placement can "learned" by driving a trusted vehicle over the length of each lane approaching a signalized intersection, while periodically recording the position of the trusted vehicle. This data can be recorded, for example, in the traffic signal controller memory such that the GPS location of approaching vehicles can be compared to determine the quantity and velocity of approaching vehicles for efficient control of the traffic signals. Accurate vehicle location is required to insure that each vehicle lane assignment is known.

The related patent application for "System and Method for Lane-Specific Vehicle Detection and Control" incorporated herein describes a method for using vehicle-specific GPS data in coordination with known traffic signal phases to determine the specific lane of travel for specific vehicles.

As described in a related patent application referenced above and incorporated herein, the systems and methods disclosed herein include various means of using onboard equipment (OBE) installed or used in a vehicle and roadside equipment (RSE) that detects the vehicle by communicating with the OBE. Of course, in various embodiments, some or all of the components of the RSE could be physically located other than "roadside", such as in a cabinet, traffic controller, signal head, or otherwise. The RSE can be used to control many different types of traffic equipment, and can be used to collect and send data to a central monitoring station for further analysis or action, using common networking and communication techniques.

For the onboard equipment, global positioning system (GPS) and radio technology can be used. By processing the signals received from several satellites, a GPS receiver accurately and precisely computes latitude and longitude, such as within 3 feet of error.

SPaT data can be transmitted from the traffic signal controller to the vehicles via Direct Short Range Radio (DSRC). If the traffic signals are controlled by timing patterns, the traffic control computer could then broadcast the time remaining until signal change, which could be used to warn the driver of dangerous situations. In such a case, pre-timed intersection controllers can send wireless SPaT to a vehicle equipped with a wireless receiver and global positioning system (GPS). Using the SPaT information, along with the speed and location GPS information, the system can perform the following functions at a live intersection:

- Dynamic vehicle location can be shown on the navigation screen.
- Traffic signal shown on the navigation screen with RED YELLOW GREEN updated within 40 milliseconds, other suitable time of the traffic signal.
- The countdown time until signal change can be shown on the vehicle navigation screen.
- An audible driver alarm based on vehicle speed and time remaining to GREEN can be produced by the vehicle navigation system.
- Automatic braking to crosswalk before light changed to YELLOW can be implemented in a vehicle.
- Automatic braking can be overridden when approaching RED that will change to change to GREEN before arrival.
- Simulated rumble strips can be produced by the vehicle by actuating the antilock braking system prior to onset of the dilemma zone.

Although a great advancement to the state of the art, this basic system is effective with a pre-timed control and is not effective if the intersection is actuated, as the SPaT information was simply a wireless transmission of the signal timing FIG. 1 depicts a simplified block diagram of an onboard equipment system 100 in accordance with disclosed embodiments. In this diagram, processor 104 is connected between a GPS receiver 102 and a transceiver 106, such that the processor 104 receives the geographic location of the GPS receiver 102 and precise time of day, updated continually or periodically. The GPS receiver 102 receives the geographic location and time from the GPS and then sends it to the processor 104. The processor 104 then sends the geographic location and time, along with a vehicle identification, to the transceiver 106, which transmits the geographical location, time and the vehicle identifier via antenna 108 to the RSE.

In this manner, the RSE receives continuous updates of the geographic location at a precise time for every vehicle approaching from each direction that is within the broadcast area of the respective transceivers 106.

Those of skill in the art will recognize that not all other details are shown in this simplified diagram. For example, GPS receiver 102 may also be connected to an automobile navigation system for display of data or warnings, an emergency-communication system, the vehicle braking and control systems, other audio/visual indicators, or to other components of the automobile. The GPS receiver 102, processor 104, and transceiver 106 will each also be connected to a vehicle power source, and may each be connected to other systems and components of the vehicle. The processor 104, and other components, can be connected to read and write to a storage such as volatile and non-volatile memory, magnetic, optical, or solid-state media, or other storage devices. The antenna 108 may be dedicated to transceiver 106, or may be connected to be shared with other components. Transceiver 106 itself can be only a wireless transmitter, although of course it receives data from the processor 104, or can also be a wireless receiver. Processor 104 may be configured to perform only the processes described herein, or can also be configured to perform other processes for the operation and management the vehicle. The various components of FIG. 1 could be constructed as separate elements connected to communicate with each other, or two or more of these components could be integrated into a single device.

FIG. 2 depicts a simplified block diagram of a roadside equipment system 200, in accordance with disclosed embodiments, that can be configured to perform processes as described herein. In this diagram, processor 204 is connected between a control system 202 and a transceiver 206. The transceiver 206 receives the geographic location, time information, and vehicle identification data from multiple OBE transceivers 106 that includes the location data and corresponding time data for multiple uniquely-identified vehicles, updated continually or periodically. The transceiver 206 receives this data from the vehicles and then sends it to the processor 204, and can also send messages to vehicles as described herein. The processor 204 then sends the geographic location and time to the control system 202, which can use it for traffic control and management processes, as described in more detail herein, including direct control of one or more traffic signals. Control system 202 can be a signal controller, or a traffic signal with integrated controller, or other system configured to control traffic equipment. Control system 202 can also include a GPS receiver 210 configured to receive GPS signals including precise time and location signals. Control system 202 is connected to GPS receiver 210 such that control system 202 can receive the same precise time of day as received by GPS receiver 102 of the onboard equipment system 100 of nearby vehicles. RSE 200 can be implemented in a roadside cabinet, in a traffic signal or other traffic equipment, or some combination of these.

Those of skill in the art will recognize that not all other details are shown in this simplified diagram. For example, control system 202, processor 204, and transceiver 206 will each also be connected to a power source, and may each be connected to other systems and components of the RSE. The processor 204, and other components, can be connected to read and write to a storage such as volatile and non-volatile memory, magnetic, optical, or solid-state media, or other storage devices. The antenna 208 may be dedicated to transceiver 206, or may be connected to be shared with other components. Transceiver 206 itself can be only a wireless receiver, although of course it transmits data to the processor 204, or can also be a wireless transmitter. Processor 204 may be configured to perform only the processes described herein, or can also be configured to perform other processes for the operation and management the RSE. The various components of FIG. 2 could be constructed as separate elements connected to communicate with each other, or two or more of these components could be integrated into a single device. In particular, processor 204 can be an integral part of the control system 202, and perform many or all of the other functions of the RSE.

The incorporated related applications describe processes for commissioning and operating such a GPS-enabled traffic control system. Commissioning includes setting up the RSE and using a vehicle with the disclosed OBE to define the detection zones for each of the roads, and lanes of those roads, of interest. Operation can include detecting the vehicles, by the RSE receiving the vehicle data from the OBE, determining if the vehicle is in a detection zone, and producing a control signal, such as to control a traffic signal.

Disclosed embodiments provide SPaT countdown information from an actuated signal control plan, for an effective driver information and warning system even with actuated signal controls. Disclosed embodiments extend the visible YELLOW by adding a "Pre-YELLOW" phase that is transmitted from the traffic control computer, which can function as the control system 202 of RSE 200, to the OBE 100, to be received by transceiver 100.

For example, a high-speed intersection might be programmed with 7 seconds of Pre-Yellow, to be transmitted as phase-change information to oncoming GREEN traffic, followed by the normal 3 seconds of visible YELLOW. When a vehicle is detected on the side street, the traffic control computer sends phase-change information such as a 10-second countdown to GREEN to the vehicle approaching from the side street.

The navigation screen of a vehicle approaching on the main street can then receive the phase change information from processor 104 of the OBE 100, and show a countdown of 7 seconds remaining in GREEN, followed by a countdown of 3 seconds remaining in YELLOW. This Pre-YELLOW phase allows both vehicle computers enough time to warn the driver of upcoming signal changes, dangerous situations or to enable automatic braking at long distance, which effectively eliminates the "Dilemma Zone".

When providing information to drivers about the upcoming phase change of a traffic intersection, traffic controls that use an external method of actuation such as vehicle detector inputs pose a special problem in that they are not deterministic in their transitions to and from servicing a vehicle approach. As such, providing any advanced warning about such a change of phase, especially ones from GREEN to YELLOW are impossible with traditional approaches to traffic control.

With actuated intersection controls there are three main timing intervals for each approach: the minimum GREEN time which insures that some small but fixed amount of time will elapse for GREEN, the YELLOW time, which is generally fixed, and the RED-clearance time, which is also generally fixed. In between these times there is a time which varies and is determined by actuations provided by vehicles, trains, emergency vehicles, and pedestrians. Because the GREEN time outside minimum GREEN varies the ability to predict when a conflicting approach will require service is not possible.

Disclosed embodiments include a method of quantifying the time needed to inform a driver of an impending termination of the GREEN phase with the purpose of allowing the driver additional time to respond accordingly rather than having only the YELLOW time to react to intersection state change. This provides new methods for conveying safety information to drivers.

Disclosed embodiments include a method of measuring and providing an early indication of the phase change of the traffic controller for the intersection, and a method of communicating that state-change information to external indicator devices for a Driver or pedestrian.

In some embodiments, the communications method provides a fixed-length message which contains header information, vehicle/pedestrian information, phase information, color indication, additional information about phases currently on, phases that will be on next, and a time stamp. This message can be generated by and transmitted from the RSE to the OBE, or used by the RSE to control other traffic equipment, such as pedestrian "WALK" indicators.

The timing requirement can be met by providing an additional timing interval that is added to the beginning of the fixed YELLOW time. This time is typically not apparent or visible by observing the intersection, since the indicator for the currently served approach is still GREEN. However, the control is already "committed" to providing the fixed time for the YELLOW phase.

This change from GREEN to a "pre-YELLOW" phase is now available as information to the driver. This information is then conveyed to traffic equipment including external devices such as signal heads, countdown timers, or devices capable of interacting with a vehicle approaching the intersection. Devices internal to the vehicle, such as the OBE, can combine information about the vehicle's direction of travel, its speed, and the intersection phase information to inform the driver of an impending need to stop well before the YELLOW phase has been indicated on the signal head.

The control is provided with timing for each YELLOW phase that can extend and "borrow" time from its corresponding minimum GREEN time. Once the minimum GREEN time has been satisfied and a requirement to serve a conflicting phase has been detected, the borrowed GREEN time is counted down and treated as additional yellow time while the phase remains green to the driver. That is, while the visible indicator remains GREEN for at least the minimum GREEN time, the internal phase can change to pre-YELLOW for the remainder of the minimum visible GREEN time.

The state change from GREEN to “pre-YELLOW” is communicated to devices outside the control for purposes of warning the driver of an impending change. This message can include information about how much time remains before the intersection goes to visible YELLOW as displayed on the signal head.

The state change from “pre-Yellow” to visible YELLOW can also be communicated as another state change. At this time the YELLOW indicator is illuminated as well.

For each state change and timing value an indicator as to which type of parameter is being timed can be provided. e.g., R=red, Y=yellow, G=green, P=pedestrian, V=vehicle, H=heartbeat.

For purposes of safety additional information about preempt, priority, red clearance, and pedestrian times can also be provided in the messages sent from the RSE. A heartbeat message can sent on a second-per-second interval, or other interval, to provide a positive indication that the RSE control is operating in a normal manner.

A message that can be used to implement disclosed embodiments can consist of 6 long-words of data (6*4=24 bytes). Fields designated as “unused” are place holders for data alignment. There are two messages with the same format but different data contents based on the second byte of the message. In the case of a message containing timing information the second byte will indicate it is timing for a ‘V’ehicle or a ‘P’edestrian.

The next byte indicates which timing is being presented with the values being ‘R’ed, ‘Y’ellow, or ‘G’reen. Phases that are currently “on” are indicated by their corresponding bit being a binary 1 in the bit-field.

As an example, with this 32-bit bit-field, a message of 0000000000100010, phases 2 and 6 are on 0x0001010. The same information is conveyed in the bit-field for phases “next” which represents phases that will be serviced next. Phase time for the indicated color can be expressed in tenths of a second with a value of 10 being one second. The phase number indicates which phase this color and timing represents. Phase 1 is 1, phase 2 is 2, etc. Unix time is the time_t value as defined in the time.h file for Unix systems with the epoch being seconds since midnight, Jan. 1, 1970. A message whose second byte is the letter ‘H’ this indicates a heartbeat message. Along with the heartbeat indication there can be an integer 1-6 indicating a preempt, an integer 1-6 indicating a priority, an integer with a value of 1 indicating a controller initiated flash, an integer with a value of 1 indicating the cabinet is in flash. The last integer of this second message type has the same Unix time.

In other embodiments, the message can include a vehicle identifier derived from the vehicle data transmitted by the OBE to the RSE. This vehicle identifier can be used to direct the message to one or more specific vehicles, such as to direct the message to vehicles in a particular roadway lane.

FIG. 3 depicts a flowchart of a process in accordance with disclosed embodiments. The RSE steps described below can be performed by processor 204, in various embodiments.

The RSE controls an actuated traffic signal for an intersection (step 305). The traffic signal has multiple phases, referred to in this example as GREEN, RED, YELLOW, and pre-YELLOW, though of course other colors or indicators could be used.

In this example, it is assumed that the RSE is maintaining the current phase of the traffic signal as Control GREEN in a given first direction, and a visible GREEN indicator is shown in that direction, whether a GREEN ball, or arrow, or otherwise. As part of this step, the RSE can transmit a message indicating the current phase and phase time, as described herein.

The RSE detects an event that indicates the phase of the traffic signal in the first direction should be changed (step 410). This event can be, for example, detection of a vehicle on a cross street using inductive loop, video detection, or transmitted location techniques, or it can be a pedestrian crossing request, or the detected approach of an emergency vehicle.

In some embodiments, this detection can be the transmitted location processes described in related and incorporated applications, where the RSE receives vehicle data including location data from the OBE of at least one vehicle that can be used to determine vehicle location, direction, speed, including determining the specific lane of the vehicle. The vehicle data can include a vehicle identifier.

In response to detected event, the RSE changes the phase of the signal in the first direction to a pre-YELLOW phase (step 415). This step can be delayed until some or all of a minimum GREEN phase time in the first direction has expired. In the pre-YELLOW phase, the visible GREEN indicator continues to be displayed in the first direction.

During the pre-YELLOW phase, and as a part of this step, the RSE wirelessly transmits a message, for example to at least one vehicle, indicating the current phase of the signal and the phase time based on the precise time as received by GPS receiver 210. The current phase, in this step, is “pre-YELLOW”, and the phase time can be represented, for example, as a countdown to the next phase change or as the absolute time of the phase change, with or without a timestamp for the message. The phase time, when combined with the previous GREEN phase, should not be less than the minimum GREEN phase time, if any.

The vehicle receives the message by the OBE, and can then produce audio and/or video indicators of the pre-YELLOW stage, or deliver other warning indicators, such as activating anti-lock braking systems.

In some embodiments, the transmitted message can be directed only in the first direction to the approaching vehicles, or can be directed in multiple directions, to alert all vehicles to the impending phase change. In some embodiments, the RSE also receives vehicle data, including a vehicle identifier, from a vehicle approaching in the first direction, and the transmitted message can be specifically addressed to that vehicle using the vehicle identifier.

After the expiration of the phase time, the RSE places the traffic signal in a YELLOW phase (step 420). As part of this step, the RSE can also transmit another message indicating the current phase and phase time, as described herein.

The RSE maintains the YELLOW phase for a YELLOW phase time, which is typically predetermined for the intersection (step 425).

The RSE places the traffic signal in a RED phase in the first direction (step 430). As part of this step, the RSE can also transmit another message indicating the current phase and phase time, as described herein.

The RSE changes the phase of the traffic signal in other directions, and can change the state of other traffic equipment, such as a pedestrian WALK indicator (step 435).

In other phases, as the OBE of each vehicle receives transmitted messages, the vehicle can display audio or visual indicators to drivers to indicate the current and next phases of the signal that the vehicle is approaching.

The process above can be performed repeatedly and simultaneously for a plurality of vehicles and a plurality of traffic devices, to constantly inform multiple vehicles of the state of traffic signals.

For each change of signal phase described above, the RSE 200 can use the precise time as received by GPS receiver 210 to change the roadside signal visible to the driver. Similarly, the OBE system 1002 can use the precise time as received by GPS receiver 102 to construct the phase available for use by the vehicle. This predictive method of determining phase state and changes eliminates error associated with the latency of data transmission. Precise synchronization of roadside signal and on-board signal can be particularly important for active safety applications such as automatic braking at high approach speeds. In some embodiments, the transmitted phase time corresponds to a global positioning system time so that the change of phase is synchronized with an indication displayed to a driver of a vehicle. In these cases, the indication based on the message and the global positioning system time as received by the vehicle's OBE.

Disclosed embodiments provide distinct technical advantages in traffic control, as driver safety at actuated intersections is improved by the addition of countdown time to signal change, that can be available to the driver on the navigation screen or by other indicator. Driver safety at actuated intersections is improved by the cooperation between the RSE or traffic signal control computer and the vehicle's OBE, via automatic braking, virtual rumble strips and others. Environmental improvements can realized, in some embodiments, by using the traffic signal controller to STOP the vehicle's engine before the signal changes and recover regenerative braking energy to power the vehicle accessories while stopped at the light, and thereafter START the engine before the signal changes to GREEN. In various embodiments, the visible YELLOW signal is unchanged for drivers of vehicles that are not SPaT-equipped. Traffic control formulas and calculations for coordinated arterial streets can be left unchanged when implementing various embodiments; traffic engineers simply extend the YELLOW mathematical term in the formulas to include Pre-YELLOW, so that the normal progression of vehicles still works the same familiar way. The Pre-YELLOW time can be adjusted by Traffic Engineers as needed for the local speed limits. The SPaT information can be identical for the automobile manufacturers regardless of signal control strategy.

Those skilled in the art will recognize that, for simplicity and clarity, the full structure and operation of all systems suitable for use with the present disclosure is not being depicted or described herein. Instead, only so much of an OBE and RSE system as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for controlling traffic signals, comprising:
- maintaining a traffic signal in a GREEN phase in a first direction, including displaying a GREEN indicator in the first direction;
- detecting an event indicating that the phase of the traffic signal in the first direction should be changed;
- changing the phase of the traffic signal to a pre-YELLOW phase in response to the detected event, including continuing to display the GREEN indicator in the first direction;
- wirelessly transmitting a message indicating the pre-YELLOW phase and a phase time from a transceiver of a traffic control system to a transceiver of a vehicle approaching in the first direction, the phase time indicating a next change of phase of the traffic signal, wherein the message is addressed to the vehicle approaching in the first direction using a vehicle identifier corresponding to the vehicle approaching in the first direction; and
- changing the phase of the traffic signal to a YELLOW phase in the first direction when the phase time has been reached.

2. The method of claim 1, wherein the transmitted message is received by a vehicle, and the vehicle displays an indication to a driver of the next change of phase.

3. The method of claim 1, wherein GREEN indicator is displayed for at least a predetermined minimum GREEN time, when the GREEN phase and pre-YELLOW phase are combined.

4. The method of claim 1, wherein the detected event includes detection of a vehicle on a cross street.

5. The method of claim 1, wherein the detected event includes a pedestrian crossing request.

6. The method of claim 1, wherein a message is also wirelessly transmitted during YELLOW phase indicating the YELLOW phase and a phase time.

7. The method of claim 1, wherein the traffic signal changes to a RED phase after the YELLOW phase, and a message is also wirelessly transmitted during RED phase indicating the RED phase and a phase time.

8. The method of claim 1, wherein the message is wirelessly transmitted in substantially only the first direction.

9. The method of claim 1, wherein the message includes a timestamp.

10. The method of claim 1, wherein the transmitted phase time corresponds to a global positioning system time so that the change of phase is synchronized with an indication displayed to a driver of a vehicle, the indication based on the message and the global positioning system time.

11. A roadside equipment (RSE) system comprising at least a processor and a wireless transceiver, the RSE system configured to perform the steps of:

maintaining a traffic signal in a GREEN phase in a first direction, including displaying a GREEN indicator in the first direction;

detecting an event indicating that the phase of the traffic signal in the first direction should be changed;

changing the phase of the traffic signal to a pre-YELLOW phase in response to the detected event, including continuing to display the GREEN indicator in the first direction;

wirelessly transmitting a message indicating the pre-YELLOW phase and a phase time from the transceiver of RSE to a transceiver of a vehicle approaching in the first direction, the phase time indicating a next change of phase of the traffic signal, wherein the message is addressed to the vehicle approaching in the first direction using a vehicle identifier corresponding to the vehicle approaching in the first direction; and changing the phase of the traffic signal to a YELLOW phase when the phase time has been reached.

12. The RSE system of claim 11, wherein the transmitted message is received by a vehicle, and the vehicle displays an indication to a driver of the next change of phase.

13. The RSE system of claim 11, wherein GREEN indicator is displayed for at least a predetermined minimum GREEN time, when the GREEN phase and pre-YELLOW phase are combined.

14. The RSE system of claim 11, wherein the detected event includes detection of a vehicle on a cross street.

15. The RSE system of claim 11, wherein the detected even includes a pedestrian crossing request.

16. The RSE system of claim 11, wherein a message is also wirelessly transmitted during YELLOW phase indicating the YELLOW phase and a phase time.

17. The RSE system of claim 11, wherein the traffic signal changes to a RED phase after the YELLOW phase, and a message is also wirelessly transmitted during RED phase indicating the RED phase and a phase time.

18. The RSE system of claim 11, wherein the message is wirelessly transmitted in substantially only the first direction.

19. The RSE system of claim 11, wherein the message includes a timestamp.

20. The RSE system of claim 11, wherein the transmitted phase time corresponds to a global positioning system time so that the change of phase is synchronized with an indication displayed to a driver of a vehicle, the indication based on the message and the global positioning system time.

* * * * *